United States Patent [19]

Ledebuhr

[11] Patent Number: 4,824,214
[45] Date of Patent: Apr. 25, 1989

[54] UNITARY PREPOLARIZING PRISM ASSEMBLY FOR A FOUR COLOR LIQUID CRYSTAL LIGHT VALVE IMAGE PROJECTOR

[75] Inventor: Arno G. Ledebuhr, Pleasanton, Calif.

[73] Assignee: Hughes Aircraft Company, Los Angeles, Calif.

[21] Appl. No.: 13,480

[22] Filed: Jul. 27, 1987

[51] Int. Cl.$^4$ .................. G02F 1/13; G02B 27/28; G02B 21/00
[52] U.S. Cl. .................. 350/337; 350/331 R; 350/174; 350/401; 353/31
[58] Field of Search .......... 350/337, 342, 331 R, 350/174, 401; 352/20, 31, 33, 81, 84, 122

[56] References Cited

U.S. PATENT DOCUMENTS

| | | | |
|---|---|---|---|
| 2,958,258 | 11/1960 | Kelly | 353/20 |
| 4,019,807 | 4/1977 | Boswell et al. | 350/342 |
| 4,191,456 | 3/1980 | Hong et al. | 353/31 |
| 4,345,258 | 7/1982 | Tsai et al. | 350/351 |
| 4,425,028 | 1/1984 | Gagnon et al. | 353/31 |
| 4,461,542 | 7/1984 | Gagnon | 350/331 R |
| 4,464,018 | 8/1984 | Gagnon | 350/331 R |
| 4,464,019 | 8/1984 | Gagnon | 350/331 R |
| 4,500,172 | 2/1985 | Gagnon et al. | 350/337 |
| 4,544,237 | 10/1985 | Gagnon | 353/31 |
| 4,690,526 | 9/1987 | Ledebuhr | 350/337 |

Primary Examiner—Stanley D. Miller
Assistant Examiner—Tai Van Duong
Attorney, Agent, or Firm—A. W. Karambelas

[57] ABSTRACT

A simple, less costly prepolarizing prism assembly for a four color liquid crystal light valve image projector is disclosed. The invention is a unitary assembly which provides a combined beam of light having a first component of a first color and first polarization state and a second component of a second color and a second polarization state. The invention includes a first color filter for reflecting, from an input beam of unpolarized white light, light of a third color and transmitting light of the first and second colors in a combined beam along a first optical path. A first prepolarizer is mounted on the first filter for extracting, from the combined beam, light of a second color and the first polarization state. A second prepolarizer is mounted on the first prepolarizer for extracting, from the combined beam, light of a first color and the second polarization state.

5 Claims, 3 Drawing Sheets

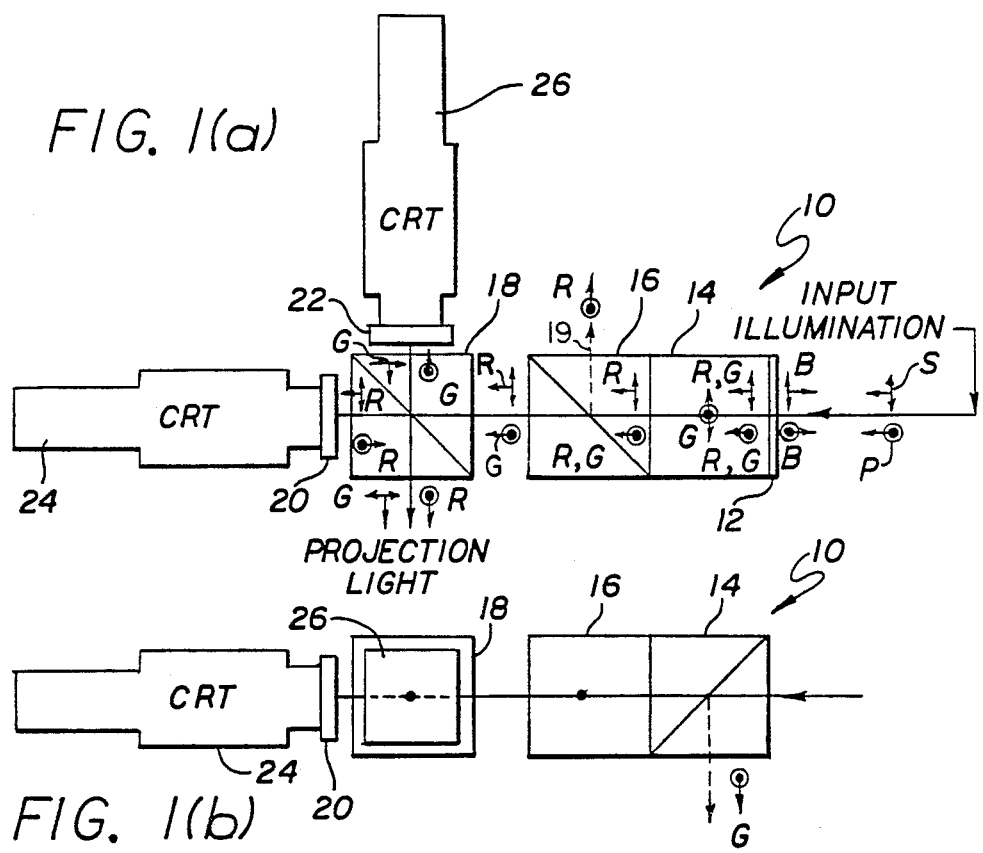
FIG. 1(a)
FIG. 1(b)
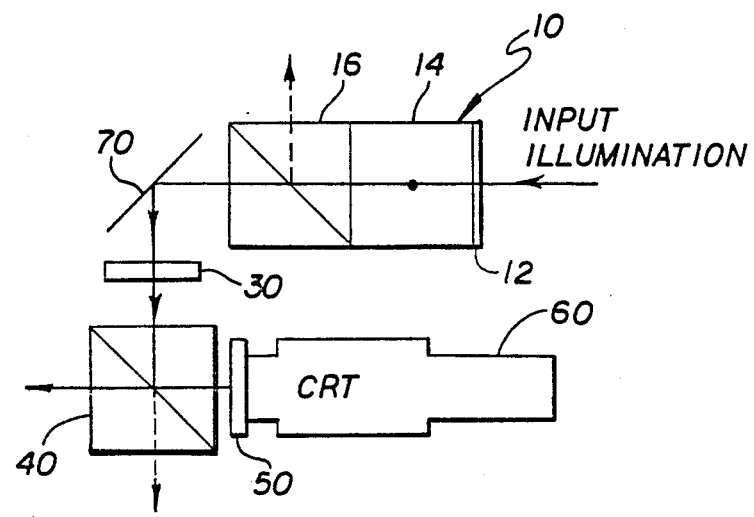
FIG. 3 a) BLUE FILTER b) GREEN PRE-POLARIZER c) RED PRE-POLARIZER d) MAIN POLARIZER/ ANALYZER

UNITARY PREPOLARIZING PRISM ASSEMBLY FOR A FOUR COLOR LIQUID CRYSTAL LIGHT VALVE IMAGE PROJECTOR

BACKGROUND OF THE INVENTION

1. Field of the Invention

The present invention relates to image projection systems. More specifically, the present invention relates to prepolarizers for liquid crystal light valve image projection systems.

While the invention is described herein with reference to an illustrative embodiment for a particular application, the invention is not limited thereto. Those of ordinary skill in the art and access to the teachings provided herein will recognize additional modifications, applications and embodiments within the scope of the invention.

2. Description of the Related Art

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirrors is polarization-modulated in accordance with the information incident on the photoconductor. Therefore, when a complex distribution of light, for example, a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 disclosed such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 *Society for Information Display* (SID), International Symposium, Digest of Technical Papers, May 1979, pp. 22–23.

More sophisticated liquid crystal light valve image projection systems are illustrated in the following patents: U.S. Pat. No. 4,425,028, issued to R. J. Gagnon et al on Jan. 10, 1984; U.S. Pat. No. 4,544,237, issued to R. J. Gagnon on Oct. 1, 1985; U.S. Pat. No. 4,461,542, to R. J. Gagnon on July 24, 1984; and U.S. Pat. No. 4,464,019, issued to R. J. Gagnon on Aug. 7, 1984.

These designs provide high resolution, high contrast color images by separating an input beam into different optical paths for polarization and/or color processing. The beams are then recombined at or prior to illumination of a main polarizing prism. Some of the prior systems are monochrome, others utilize two colors, while some provide a full color output. The advantages of color are well recognized. Unfortunately, a full color system is a most demanding, and hence typically most costly, application for a liquid crystal light valve image projection system. That is, although the above noted full color systems effectively and efficiently provide high quality color images, the optical components required for the separation and recombination of beams adds significantly to the cost of the system. Thus, a need has been recognized in the art for less costly liquid crystal light valve color projector designs. In addition, it would be desirable to add a multi-color capability to many of the monochrome projectors which are currently in use.

A four color system holds the promise of satisfying the need in the art for a less costly liquid crystal light valve color projector design. As a less demanding application for a projection system, it would ease color requirements and require a simpler illumination system. What would remain then would be a need for a system that would allow for a retrofit of existing monochrome projectors to provide limited multi-color capability.

SUMMARY OF THE INVENTION

The needs illustrated by the related art are addressed by the prepolarizing prism assembly for a four color liquid crystal light valve image projector of the present invention. The invention is a unitary assembly which provides a combined beam of light having a first component of a first color and first polarization state and a second component of a second color and a second polarization state. The invention includes a first color filter for reflecting, from an input beam of unpolarized white light, light of a third color and transmitting light of the first and second colors in a combined beam along a first optical path. A first prepolarizer is mounted on the first filter for extracting, from the combined beam, light of a second color and the first polarization state. A second prepolarizer is mounted on the first prepolarizer for extracting, from the combined beam, light of a first color and the second polarization state. While providing a less costly color design, the prepolarizing assembly of the present invention allows for the retrofit of many existing monochrome designs.

BRIEF DESCRIPTION OF THE DRAWINGS

FIG. 1(a) is a top view of a simplified diagramatic representation of the prepolarizing prism assembly of the present invention in a four color image projection system using two liquid crystal light valves.

FIG. 1(b) is a side view of the simplified diagramatic representation of FIG. 1(a).

FIG. 3 is a simplified diagramatic representation of the prepolarizing prism assembly of the present invention in a field sequential four color image projection system using a single liquid crystal light valve.

DESCRIPTION OF THE INVENTION

The present invention provides a simple, low cost, unitary prepolarizing prism assembly for four color liquid crystal light valve image projection systems. The unique orientation and combination of beamsplitters provided in a unitary structure by the present invention substantially eliminates the alignment problems associated with many prior designs. The prepolarizing prism assembly disclosed herein provides a more simple design by eliminating the separation and recombination of beams in the prepolarizing assembly.

Figure 2:
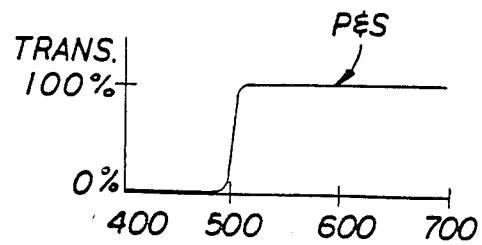
FIG. 2(a) is an illustrative transmission curve for a blue filter used in the prepolarizing prism assembly of the present invention.
FIG. 2(b) is an illustrative transmission curve for a green prepolarizing prism used in the prepolarizing prism assembly of the present invention.
FIG. 2(c) is an illustrative transmission cure for a red prepolarizing prism used in the prepolarizing prism assembly of the present invention.
FIG. 2(d) is an illustrative transmission curve for a main polarizing prism used in the prepolarizing prism assembly of the present invention.
Figure 2:
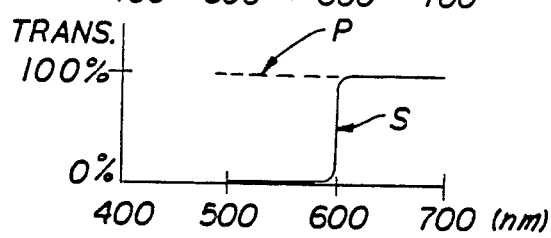
Figure 2:
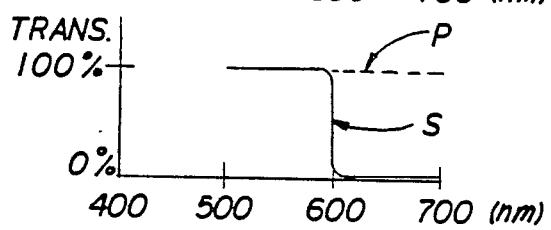
Figure 2:
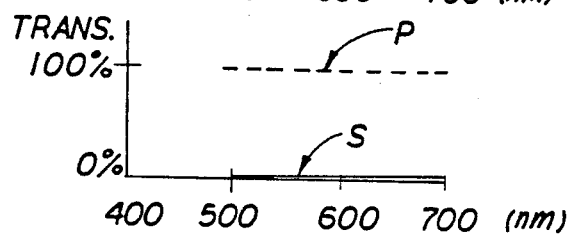

The prepolarizing prism assembly 10 of the present invention is shown in FIGS. 1(a) and 1(b) in the illustrative application of a four color liquid crystal light valve image projection system using two light valves. In FIGS. 1(a) and 1(b) the symbol ⊙ indicates an electric field vector out of the page and the symbol ↕ indicates an electric field vector parallel to the page. The arrows ← and → ↓ and ↑ indicate the direction of light beams are traveling. The characters R, G, and B indicate red light, green light, and blue light, respectively. On the front end of the assembly 10 is a blue filter 12. This zero degree filter 12 is an off-the-shelf design which reflects blue light of both polarizations and transmits the red and green wavelengths in an incident input beam of white light. The blue filter 12 could be incorporated into a conventional ultraviolet (UV) filter (not shown) to reduce the number of separate filters. (The UV filter is often used to provide protection to the oil filled prisms and the liquid crystal light valve.) An illustrative transmission curve for the blue filter 12 is shown in FIG. 2(a).

The blue filter 12 is mounted on the surface of a green prepolarizing prism 14 which is mounted at 90 degrees with respect to an attached red prepolarizing prism 16 and a main prism 18. See the side view of FIG. 1(b). The green prepolarizer 14 is shown at 45 degrees. The green prepolarizer 14 may be mounted at other angles without departing from the scope of the invention. The green prepolarizer 14 is a conventional MacNeille biprism designed to transmit P polarized white light and red S polarized light and to reflect green S polarized light. (For the green prepolarizer 14 as viewed in FIG. 1(a), P polarized light is defined as having an electric field vector normal to the page and the S polarized light is defined as having an electric field vector parallel to the page.) By removing the green S polarized light, the green light is prepolarized. An illustrative transmission curve for a green prepolarizer is shown in FIG. 2(b).

The red prepolarizer 16 is attached to the green prepolarizer 14 and rotated 90 degrees relative thereto. See the side view of FIG. 1(b). The red prepolarizer 16 is designed to transmit white P and green S while reflecting red S light. However, since the red prepolarizer 16 is rotated 90 degrees relative to the green prepolarizer 14, the S and P polarizations are reversed with respect to the red polarizer 16. That is, light of S and P polarizations with respect to the green prepolarizer 14 is P and S polarized, respectively, relative to the red prepolarizer 16. The result is that, as viewed in FIG. (1a), the red light having an electric field vector normal to the page is S polarized light with respect to the red polarizer (but it was P polarized with respect to the green polarizer 14) and is reflected by the red polarizer 16 as shown by dashed arrow 19. Thus, what remains of the illumination is a single combined beam having two component beams of two colors and polarization states. That is, as viewed in FIG. 1(a), the output beam has polarized green light having an electric field vector normal to the page and polarized red light having an electric field vector parallel to the page. An illustrative transmission curve for the red prepolarizer 16 is shown in FIG. 2(c).

The main polarizing prism 18 is a conventional off-the-shelf MacNeille type bi-prism or other suitable beamsplitter. The main polarizer 18 is oriented parallel to the red prepolarizer 16 so that S polarization is normal to the page and P polarization is parallel to the page, respectively as viewed in FIG. 1(a). The main polarizer 18 directs the combined beam to first and second light valves 20 and 22 respectively. The red P polarized light is transmitted to the first light valve 20. As is well known in the art, the first light valve 20 receives input from a first cathode ray tube (CRT) 24 and, on a pixel by pixel basis, changes the polarization state of the red P component in response thereto. The polarization modulated red light is reflected by the first light valve 20 to the main prism as S polarized light. Similarly, the green S polarized light is reflected by the main polarizer 18 to the second light valve 22. The second light valve 22 receives input from a second CRT 26. The second light valve 22 returns green polarization modulated light to the main polarizer 18 as P polarized light. The main polarizer 18 reflects the red S polarized light and transmits the green P polarized light to projection optics (not shown). Those of skill in the art will recognize that by varying the intensity of the red and green outputs, images in yellow and orange light may be created. The intensity of the red and green outputs is varied by varying the intensity of the inputs provided by the first and second CRTs 24 and 26. Thus, a four color, two light valve, image projector is provided with a simple low cost prepolarizing assembly. It is also understood that the prepolarizer 10 and the main polarizer 18 may be manufactured as a single integral unit.

The present invention also allows for the implementation of a four color image projection system with a single light valve. As shown in FIG. 3, this is accomplished using a liquid crystal switch 30. The prepolarizing assembly 10 provides a combined beam with red and green component beams in the manner described above. When the liquid crystal switch 30 is off, it interchanges the polarization states of the incident red and green components of the combined beam. When the liquid crystal switch 30 is on, the beam is transmitted with the polarizations unchanged. In this application, the main polarizer 40 reflects only S polarized light to the light valve 50. The switch 30 provides red S polarized light to the main polarizer 40 when it is on and green S polarized light when it is off. The light valve 50 and CRT 60 operate in the manner described above to modulated the polarization state of the incident red or green light and return it to the main polarizer 40. The input image to the light valve must be switched by the CRT in unison with the operation of the optical switch 30 so that the correct red and green images are provided. The switching rate is such that the alternate images provided by the main polarizer 40 and projection optics (not shown) are fused in the eye of an observer. Thus, a complete combined image is provided. By varying the intensity of red and green images from the CRT 60 to the light valve 50, yellow and orange colors may be created in addition to red and green. A fold mirror 70 may be included to reduce the size of the projection system.

Figure 4:
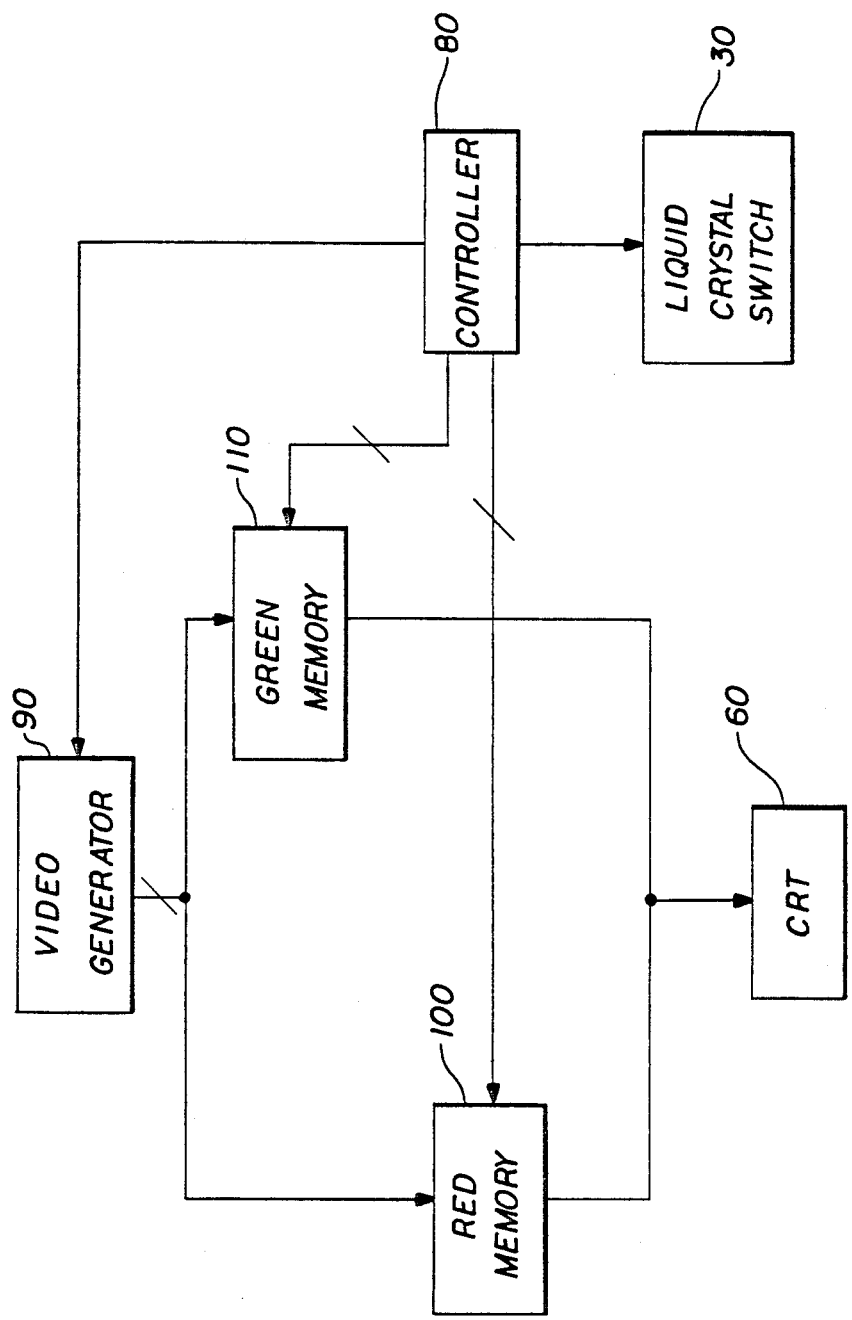
FIG. 4 shows an illustrative control system for the field sequential image projection system of FIG. 3.

An illustrative control system for the field sequential image projection system of FIG. 3 is shown in FIG. 4. A microprocessor based controller 80 gates the input of video data from a video generator 90 to first and second memories 100 and 110. The first and second memories serve as buffers for the red and green images respectively. The controller 80 gates the input of data from each memory to the CRT 60 sequentially and in synchrony with the activation of the liquid crystal switch 30. Thus, when the CRT 60 is providing the light valve 50 with red image data, the switch 30 is activated. Similarly, when the CRT 60 is providing the light valve 50 with green image data, the controller turns off the liquid crystal switch 30. Those of ordinary skill in the art will recognize other suitable control schemes.

Thus, the present invention has been described with reference to a particular embodiment in connection with illustrative applications. Those of ordinary skill in the art will recognize additional modifications, applications and embodiments within the scope of the present invention. For example, the invention is not limited to the colors chosen for the elements of the prepolarizing prism assembly of the illustrated embodiments. Those skilled in the art will recognize that other colors may be used for the filter 12 and the prepolarizers 14 and 16. The invention is not limited to the any particular combination of colors with polarization states. Nor is the invention limited to any particular application. While the system of FIG. 3 above is particularly well suited for the retrofit of existing monochrome projectors, it is understood that the invention may be used in any application requiring the generation of beams of more than one color and polarization state.

It is intended by the appended claims to cover any and all such modifications, applications, and embodiments.

Thus,

What is claimed is:

1. A four color liquid crystal light valve image projector comprising:
   a prepolarizing prism assembly for which provides, from an input beam of unpolarized white light, an output beam of light having a first component of a first color and first polarization state and a second component of a second color and a second polarization state, said prepolarizing prism assembly providing a first optical path from an input end to an output end;
   an optical switch for selectively changing the polarization state of input light, said optical switch disposed for receiving said output beam of light from said prepolarizing prism assembly, said optical switch alternately interchanging the polarization state of said first component of said output beam with the polarization state of said second component of said output beam to provide a sequential output beam;
   liquid crystal light valve means for modulating the polarization of light received on an input optical axis and directing polarization-modulated light back along said input optical axis; and
   a main polarizer disposed to receive said sequential output beam of light from said optical switch and said polarization-modulated light from said liquid crystal light valve means.

2. A four color liquid crystal light valve image projector as recited in claim 1 wherein said prepolarizing prism assembly comprises:
   a color filter for receiving said input beam of unpolarized white light at the input end of said optical path, said color filter reflecting light of a third color away from said optical path, said color filter transmitting light of said first and second colors along said first optical path;
   a first prepolarizer disposed on said optical path to receive the light of said first and second colors transmitted from said color filter, said first prepolarizer reflecting received light of said second color and said first polarization state away from said first optical path, said first prepolarizer transmitting the remaining components of said the light received from said color filter along the first optical path; and
   a second prepolarizer disposed on said first optical path to receive the light transmitted from said first prepolarizer, said second prepolarizer reflecting received light of said first color and said second polarization state away from said first optical path, said second prepolarizer transmitting the remaining components of the light received from said first prepolarizer along said first optical path,
   whereby an output beam of light having a first component of a first color and first polarization state and a second component of a second color and a second polarization state is provided at the output end of said first optical path.

3. A four color liquid crystal light valve image projector as recited in claim 2 wherein:
   said first prepolarizer is MacNeille biprism; and
   said second prepolarizing prism is a MacNeille biprism, said second prepolarizing prism being oriented at 90 degrees with respect to the orientation of said first prepolarizing prism.

4. A four color liquid crystal light valve image projector as recited in claim 3 wherein:
   said main polarizer is a MacNeille biprism having the same orientation as said second prepolarizer.

5. A four color liquid crystal light valve image projector as recited in claim 4 wherein:
   said color filter reflects blue light away from said optical path;
   said first prepolarizer reflects green light of said second polarization state away from the first optical path; and
   said second prepolarizer reflects red light of said second polarization state away from the first optical path, whereby, red light of said second polarization and green light of said first polarization are transmitted to the output end of said first optical path.

* * * * *